(12) United States Patent
Mueller

(10) Patent No.: US 6,430,967 B1
(45) Date of Patent: Aug. 13, 2002

(54) PRESSURE MONITORING SYSTEM USING DISPOSABLE SEALS

(75) Inventor: Peter Michael Mueller, Suwanee, GA (US)

(73) Assignee: Fitel USA Corp., Norcross, GA (US)

( * ) Notice: Subject to any disclaimer, the term of this patent is extended or adjusted under 35 U.S.C. 154(b) by 0 days.

(21) Appl. No.: 09/426,968

(22) Filed: Oct. 26, 1999

(51) Int. Cl.⁷ ................................................ C03B 37/07
(52) U.S. Cl. ...................... 65/489; 65/379; 65/418; 65/420; 65/532; 118/692; 118/730
(58) Field of Search .................... 65/379, 418, 420, 65/489, 532; 118/692, 730

(56) References Cited

U.S. PATENT DOCUMENTS

| | | | |
|---|---|---|---|
| 4,217,027 A | | 8/1980 | MacChesney et al. ...... 350/96.3 |
| 4,347,069 A | * | 8/1982 | Haney et al. ................. 65/417 |
| 4,378,987 A | * | 4/1983 | Miller et al. .................. 65/418 |
| 4,389,229 A | * | 6/1983 | Jang et al. .................... 65/418 |
| 4,445,918 A | * | 5/1984 | Modone et al. ............... 65/379 |
| 4,813,989 A | * | 3/1989 | Uchiyama et al. ............ 65/489 |
| 4,826,288 A | * | 5/1989 | Mansfield etal. ............. 65/390 |
| 4,894,079 A | * | 1/1990 | Shiomi ......................... 65/413 |
| 4,932,990 A | * | 6/1990 | Michie et al. ................ 65/420 |
| 6,105,396 A | * | 8/2000 | Glodis et al. ................. 65/377 |
| 6,131,413 A | * | 10/2000 | Rousseau et al. ............. 65/377 |
| 6,210,487 B1 | * | 4/2001 | Mueller ....................... 118/733 |

* cited by examiner

*Primary Examiner*—Sean Vincent
(74) *Attorney, Agent, or Firm*—Thomas, Kayden, Horstemeyer & Risley, LLP

(57) ABSTRACT

A pressure monitoring system for use in monitoring gas pressure within a rotating tube has a chemical delivery tube which projects into the rotating tube and whose distal end is sealed to the interior wall of the tube. A coaxial tube surrounds the delivery tube and forms a passageway between the two tubes which is in communication with the rotating tube interior through the seal mounting means. The gas pressure within the passageway is an indication of the pressure within the rotating tube, and is measured within a pressure monitoring unit which can control the pressure through the gas supply or through a low pressure device. In a second embodiment of the invention, a buffer gas supply coupling member is mounted to the coaxial tube and sealed to the exterior of the rotating tube to create a buffer zone. In a third embodiment of the invention, the buffer zone arrangement is modified to produce a more complete flow of buffer gases within the buffer zone.

21 Claims, 9 Drawing Sheets

PRESSURE MONITORING SYSTEM USING DISPOSABLE SEALS

RELATED APPLICATIONS

This application is related to those shown in U.S. patent applications Ser. No. 09/383,716 (Mueller 6) of P. M. Mueller and 09/383,780 (Mueller 5) filed on Aug. 26, 1999, the disclosures of which are incorporated herein by reference. It is also related to that shown in U.S. patent application Ser. No. 09/426,491 (Mueller 7) of P. M. Mueller, filed concurrently herewith, the disclosure of which is incorporated herein by reference.

FIELD OF THE INVENTION

The present invention is related to a sealing apparatus for chemical delivery systems and, more particularly, to the process of introducing materials under pressure into the interior of rotating tubular members, wherein the pressure within the tubular member is monitored and controlled.

BACKGROUND OF THE INVENTION

The following discussion deals with the manufacture of optical preforms of rod shape, but it is to be understood that the principles of the present invention are applicable to other, different applications involving, generally, chemical delivery systems wherein the chemicals in gaseous or vapor form are delivered under pressure.

In the modified chemical vapor deposition (MCVD) process, which is described in U.S. Pat. No. 4,217,027 issued in the names of J. B. MacChesney et al. on Aug. 12, 1980, and assigned to Bell Telephone Laboratories, Inc., a rotating glass starter tube has the chemical vapor introduced into the interior thereof, and reaction of the chemicals with the tube takes place within a constantly traversing hot zone. A moving torch heats the glass tube from the outside as the precursor gases are passed therethrough, causing deposition of submicron-sized particles on the inside surface of the tube. The torch is moved along the longitudinal axis of the tube in a plurality of passes to build up layer upon layer of particle lading glass to provide a pre-form tube. Once a sufficient number of layers have been deposited, the pre-form tube is heated, generally to a higher temperature, by the moving torch to cause the tube to collapse to yield a pre-form rod, as it is often called. The delivery system of the reactant gases to the starter tube interior is generally through a fixed metallic hollow tube connected to the source or sources of the gases. It is desirable that the space between the exterior surface of the delivery tube and the interior surface of the glass starter tube be sealed so that the critical gases do not leak out of the starter tube.

In the current method of manufacture, the apparatus which ensures sealed delivery of the deposition chemicals in the gases is a combination of a rotary union element, a structure of holding and sealing the starter tube, and a secondary face seal assembly for routing of purge gases through the structure. This is a complex apparatus that requires frequent maintenance. Existing systems also have the disadvantage of having inherently larger cavities for the accumulation of dead zones of flow, and a tendency to create particle contamination from the rotary union and face seal system. Inasmuch as the chemical delivery system is stationary, the current means of achieving delivery is via the rotary union, featuring a transition of the chemicals from a stationary pipe to a rotary pipe or to the inside of a supply coupling. The chemicals being delivered are at a pressure greater than atmospheric, and the face seal properties are the only restriction to the release of the chemicals to the atmosphere. The rotary union and secondary face seals generate a large quantity of particles from wear, and contribute to the contamination of the coupling. As the seals wear down, excessive leakage occurs both to the atmosphere and into the product (starter tube), resulting in lost product and requiring system maintenance. The complexity of the components involved requires skilled maintenance being performed using requalification through test of the system. Both material and labor costs are, consequently, high.

During the fabrication process, after sufficient deposition has taken place, the preform tube is collapsed to form a pre-form rod, as discussed in the preceding. The general process for collapsing the tube includes reducing the rate of traverse of the heat source creating the hot zone in the tube, thereby increasing the temperature of the hot zone until the tube commences to collapse, being in a semi-molten state in the hot zone. Collapsing is generally started at the end of the starter tube remote from the distal end of the gas delivery tube. Final collapse is generally performed under low gas flow conditions, and, as the tube collapses, its interior volume decreases, resulting in an increase of gas pressure in the remaining tube volume. Too great an increase in the pressure can cause a ballooning of the tube to the extent that it no longer is a uniform diameter. In addition, the increased pressure can cause increased leakage where internal seals are used. Heretofore in the prior art it has been difficult to monitor and control the pressure within the tube to the extent that ballooning and/or leakage can be minimized.

SUMMARY OF THE INVENTION

The present invention comprises an arrangement for monitoring the pressure within the starter tube and, through appropriate measuring and control, varying the pressure to prevent ballooning during tube collapse, although it can be used with other rotating tube arrangements.

In a preferred embodiment of the invention, a stationary chemical delivery tube has a sealing member of the type disclosed in the aforementioned related Mueller applications affixed adjacent the delivery end of the tube which forms a seal with the interior wall of the rotating starter tube. The seal between the tube interior and the atmosphere is maintained by the physical properties of the sealing member. In accordance with the invention, a coaxial tube surrounds the delivery tube, and has an interior diameter greater than the outer diameter of the delivery tube to create a passageway therebetween. The means by which the sealing member is affixed to the delivery tube has a passageway which serves to place the interior of the starter tube in communication with the passageway between the two tubes. The coaxial tube, and hence, the passageway extends along the length of the delivery tube to an externally mounted modified T connection wherein the gas within the passageway is applied to a pressure measuring device which measures the gas pressure within the passageway and, hence, the pressure within the starter tube. The T connection is connected to both a vacuum or low pressure source and to a pressurized source of gases used in the vapor deposition process, both under control of the pressure measuring means. This provides an arrangement for controlling leakage of the supply chemicals to the atmosphere and a controlled leakage of atmosphere into the starter tube. Thus, higher or lower pressure within the starter tube can be monitored and controlled.

The present invention, as described in the foregoing, is readily adaptable to the use of a buffer zone, the advantages of which are pointed out in the aforementioned Mueller application. Thus, a second embodiment of the invention, a modified seal coupling member is mounted on the coaxial tube and is sealed to the starter tube by means of an external seal. The coupling member has a buffer gas input port which communicates with the buffer gas chamber formed therein and a low pressure or vacuum port which also communicates with the chamber. The open end of the starter tube also communicates with the chamber, thereby forming a buffer zone between the internal seal within the starter tube and the external seal between the coupling member and the exterior of the starter tube. The coupling member is mounted on the coaxial tube and preferably, although not necessarily, is mounted to the tailstock (or headstock) of the MCVD lathe for support. Thus, with this embodiment of the invention, a buffer zone is created for recirculation of buffer gases.

In still another embodiment of the invention, the coupling member is modified to have a multi-ported central buffer gas feed into the buffer zone, with the feed member projecting into the starter tube, and with the internal sealing member mounted on the distal end thereof. The principles and features of the present invention will be more readily apparent from the following detailed description, read in conjunction with the drawings.

DETAILED DESCRIPTION

In the fabrication of the pre-form rod for drawing clad glass fibers, generally, gas plan precurser reactants together with oxygen are introduced into a rotating glass tube, i.e., a starter tube, in a constantly moving stream. The tube and its contents are heated to a homogeneous reaction temperature within a moving hot zone produced by a moving heating element which continuously traverses the outside surface of the rotating tube. Homogeneously produced glass particles, commonly called "sort" collect on the tube walls and are fused into a continuous layer within the moving hot zone. In the modified vapor deposition process (MCVD) shown and described in MacChesney et al. U.S. Pat. No. 4,217,027 the tube is continuously rotated about its longitudinal axis in a form of lathe having head and tail stocks. After the deposition of the prescribed amount of "soot", the tube is collapsed, as discussed in the foregoing, which can, and usually does, create changes in interior pressure which can lead to variations in the diameter of the uncollapsed portions of the tube. It is also the case that, occasionally, some irregularities in tube diameter may be pre-existent. The present invention is also aimed at correcting such irregularities during the manufacturing process.

Figure 1:
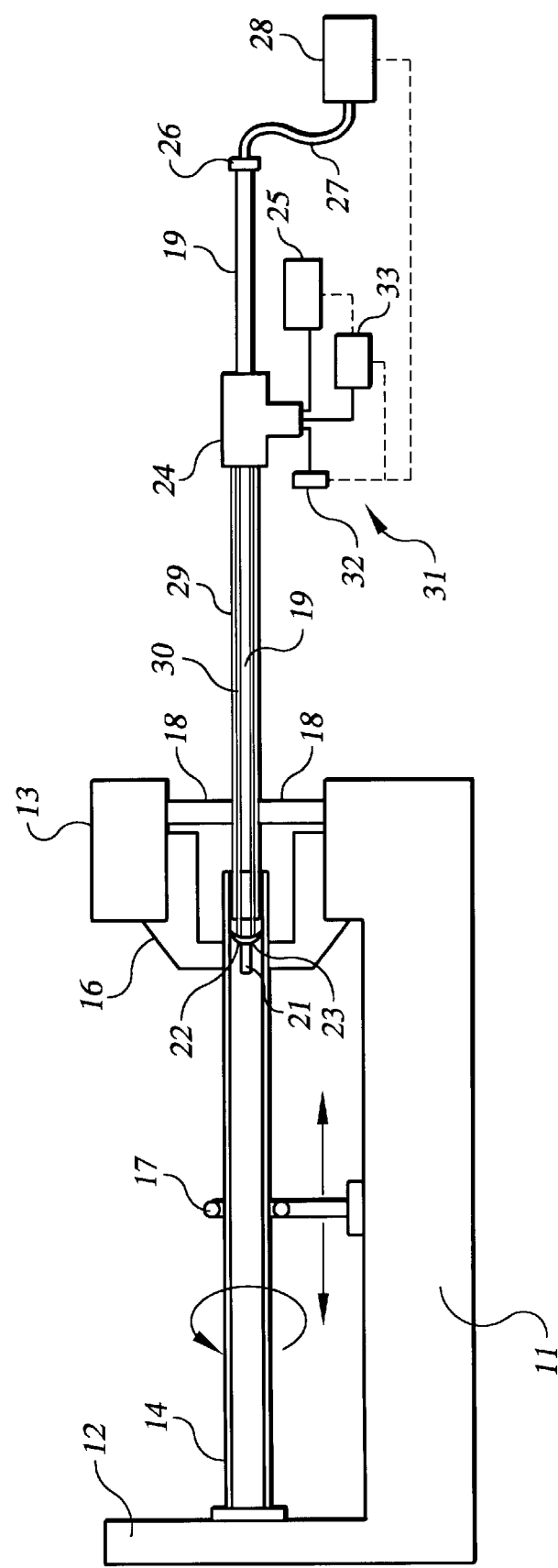
FIG. 1 is a diagrammatic view of the apparatus of the invention for monitoring starter tube interior pressure and seal leakage.

FIG. 1 is a diagrammatic view of the apparatus 10 of the invention showing both the sealing system and the pressure monitoring arrangement. A lathe 11 has, axially disposed between a tailstock 12 and a headstock 13, a starter tube 14. Tube 14 is held and rotated by a chuck 16 driven by suitable means (not shown) within the headstock 13. It is to be understood that rotation may be clockwise or counter-clockwise, but for the following discussion, it will be assumed that the direction of rotation is counter-clockwise as viewed from tailstock 12 toward headstock 13 and as indicated by the arrow. A heat or flame source 17 is movably mounted on lathe 11 for back-and-forth traversal of the length of tube 14 as indicated by the arrows.

Extending through headstock 13 and affixed thereto against rotation by suitable means 18, which may take any of a number of forms, is a chemical vapor delivery tube 19 which extends into the interior of tube 14. The distal or discharge end 21 of tube 19 has a seal member 22 which, in accordance with the aforementioned Mueller patent applications, is self-tightening, i.e., as tube 14 rotates, it tends to tighten the seal mount 23 which is accomplished, for example, by a left-hand thread mounting arrangement. Delivery tube 19 extends from the lathe 11 through a pressure measuring member 24 in the form of a modified T connector, the purpose and operation of which will be discussed more fully hereinafter, to a connection 26 connected to a conduit 27 which is, in turn, connected to a pressurized source 28 of chemical vapor. In addition, a low pressure source 25 is connected to the T-connector 24 and operates under control of control unit 33. Surrounding tube 19 is a coaxial tube 29 which has an interior diameter (I.D.) greater than the exterior diameter (O.D.) of tube 19, thereby creating a gas passageway 30 between the tubes 19 and 29 which extends from seal mount 23 to connector 24. A pressure monitor unit 31, which may comprise a gauge 32 and a control unit 33 is, as will be more clearly seen hereinafter, is connected to a chamber (not shown) within connector 24 which communicates with the passageway 30, and monitors the pressure, and monitors the pressure therein. Unit 31, more particularly control unit 33, is connected to source 28 for varying the pressure and amount of chemical vapor supplied to tube 14 depending on the measurements made by monitor unit 31.

Figure 2:
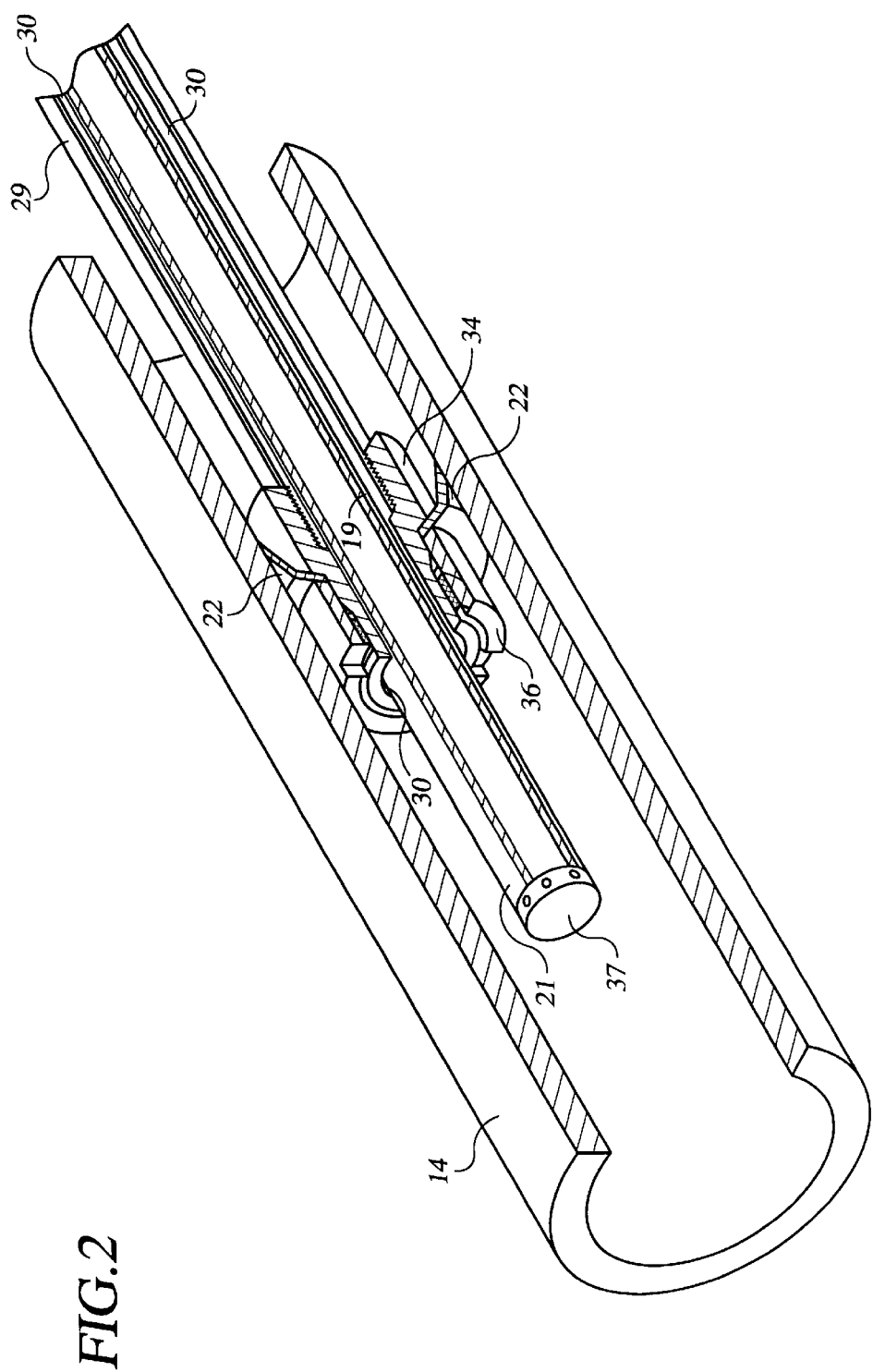
FIG. 2 is a perspective, partially cross-sectional view of the interior sealing arrangement of the present invention.

FIG. 2 is a perspective, partially cross-sectional view of that portion of the assembly of FIG. 1 in the area of the gas emission into the starter tube 14. It can be seen that the internal seal 22, which is the same type of seal shown in the aforementioned Mueller patent applications, including application Ser. No. 09/426,491 of Mueller, filed concurrently herewith, is mounted on the distal end of coaxial tube 29 by a seal mounting member comprising a first nut 34 and a second sealing nut 36. Nut 34 is shown mounted on the end of tube 29 by means of threads. However, the other mounting means, such as a press fit, bayonet lock, or welding might be used. Seal member 22 is mounted on nut 34 and fixed in position by nut 36 which forces it against a shoulder on nut 34. Nut 36 is affixed to nut 34 by means of threads, as shown, or other suitable means excluding welding or the like. The internal diameter of nut 34 is greater than the external diameter of delivery tube 19, thus creating the passageway 30 that communicates with the interior of starter tube 14 and extends rearwardly to the T connector 24, shown in FIG. 1. In the convention chosen, the threads are left-handed, thereby, as tube 14 rotates, the nuts 34 and 36 have a tightening torque applied thereto. The discharge or distal end of delivery tube 19 is terminated in a nozzle 37 for directing the gas or vapor into tube 14.

Figure 3:
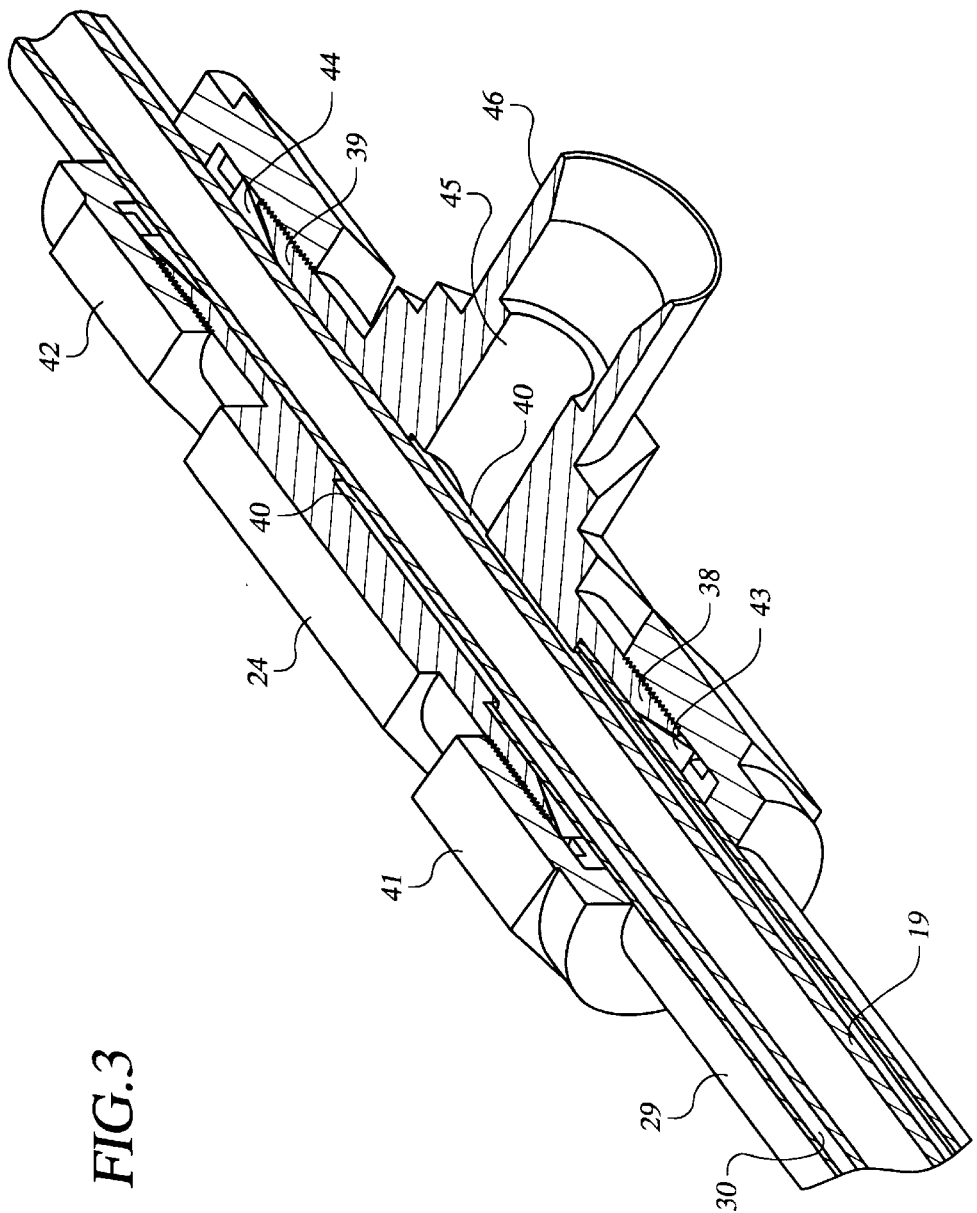
FIG. 3 is a perspective partially cross-sectional view of the monitoring connection of FIG. 1.

FIG. 3 is a perspective, partially cross-sectional view of the modified T-connector 24 which, as can be seen, is mounted at a first end 38 to the end of coaxial tube 29 and at a second end 39 to tube 19. Mounting may take any of a number of forms and is shown in FIG. 3 as first and second threaded mounting nuts 41 and 42 and sealing and gripping members 43 and 44 in the form of wedges which are forced against the tapered ends of connector 24 as the nuts 41 and 42 are tightened, thereby affixing the connector 24 firmly in place. Coaxial tube 29 extends into connector 24 and butts against an interior shoulder thereof, as shown. As a consequence, passageway 30 communicates with a chamber 40 formed in connector 24 which, in turn, communicates with the bore 45 in leg 46 of T-connector 24. In this manner, passageway 30 is connected to the monitoring and control equipment 31, as is the interior of starter tube 14, whereby the pressure in tube 14 can be monitored and controlled. The amount of gas drawn from tube 14 is, in normal operation, small and has little effect on the overall deposition operation. On the other hand, where there is an undesirable buildup of pressure, control unit 33 activates low pressure source 25 to draw off greater quantities of gas, thereby reducing the pressure in tube 14. Pressure may also be controlled by varying the pressure of the gas output from source 28 under control of control unit 33.

Operation of the monitoring arrangement 10 depicted in FIGS. 1 through 3 is as explained in the foregoing. Passageway 30 affords a means whereby the pressure in the starter tube is continuously monitored. Pressure can be increased or decreased, as explained in the foregoing to prevent diametric irregularities in tube 14 from occurring. In addition, the arrangement makes possible some correction of existing diametric irregularities to produce a more uniform starter tube. While the invention is disclosed as used in an MCVD system, the principles thereof are applicable to other types of systems also.

Figure 4:
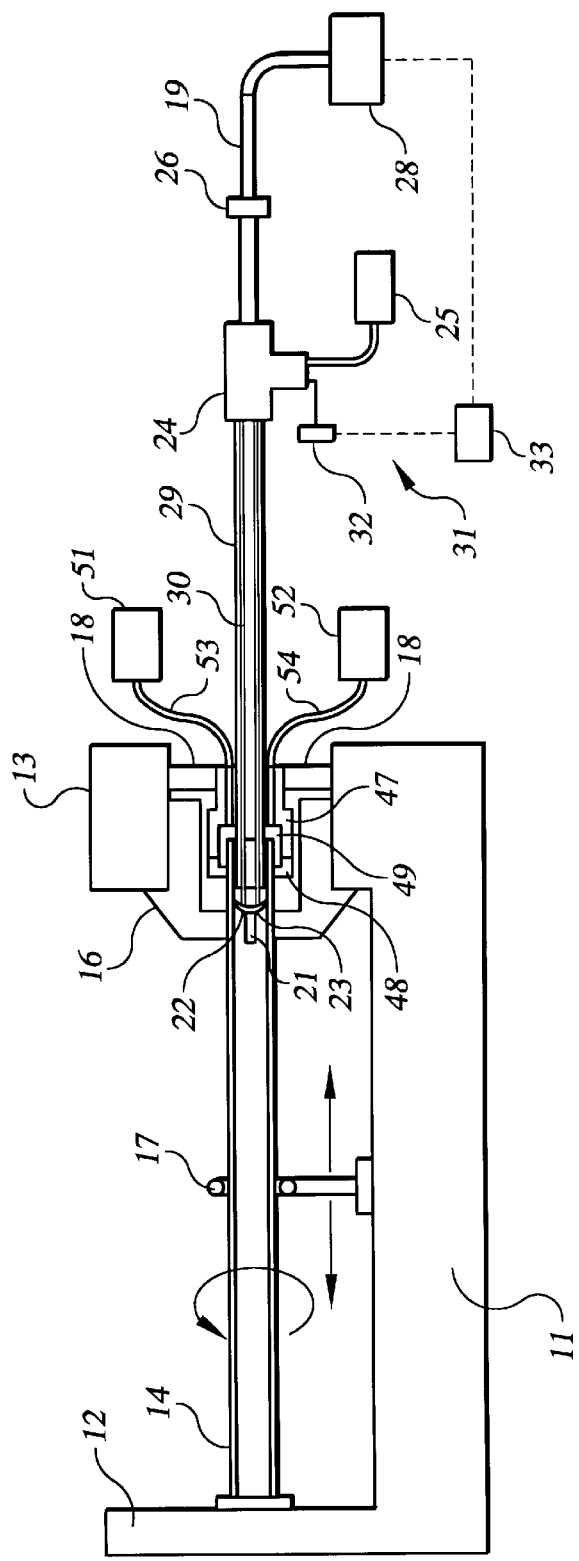
FIG. 4 is a diagrammatic view of the apparatus of the invention which incorporates a buffer zone arrangement into the system.

The monitoring assembly 10 configuration lends itself readily to the addition of a buffer gas system, the advantages of which are pointed out in the aforementioned Mueller copending applications. In FIG. 4 there is shown an embodiment of the invention wherein a buffer gas member has been added. For simplicity those elements in FIG. 4 which are the same or like elements shown in FIGS. 1 through 3 bear the same reference numerals.

In FIG. 4, the buffer gas arrangement includes a supply coupling member 47 and an external seal 48 which forms a seal between the exterior of the starter tube 14 and a chamber 49 within supply coupling member 47, as will be discussed more fully hereinafter. The interior of coupling member 47 is connected to a buffer gas source 51 and to a low pressure or vacuum source 52 by suitable conduits 53 and 54. Although not shown, a pressure gauge, which may be included with either source 51 or 52 monitors the buffer gas pressure within chamber 49. This is similar to the arrangement shown in the concurrently filed Mueller patent application Ser. No. 09/426,491 (Mueller Case 7).

Figure 5:
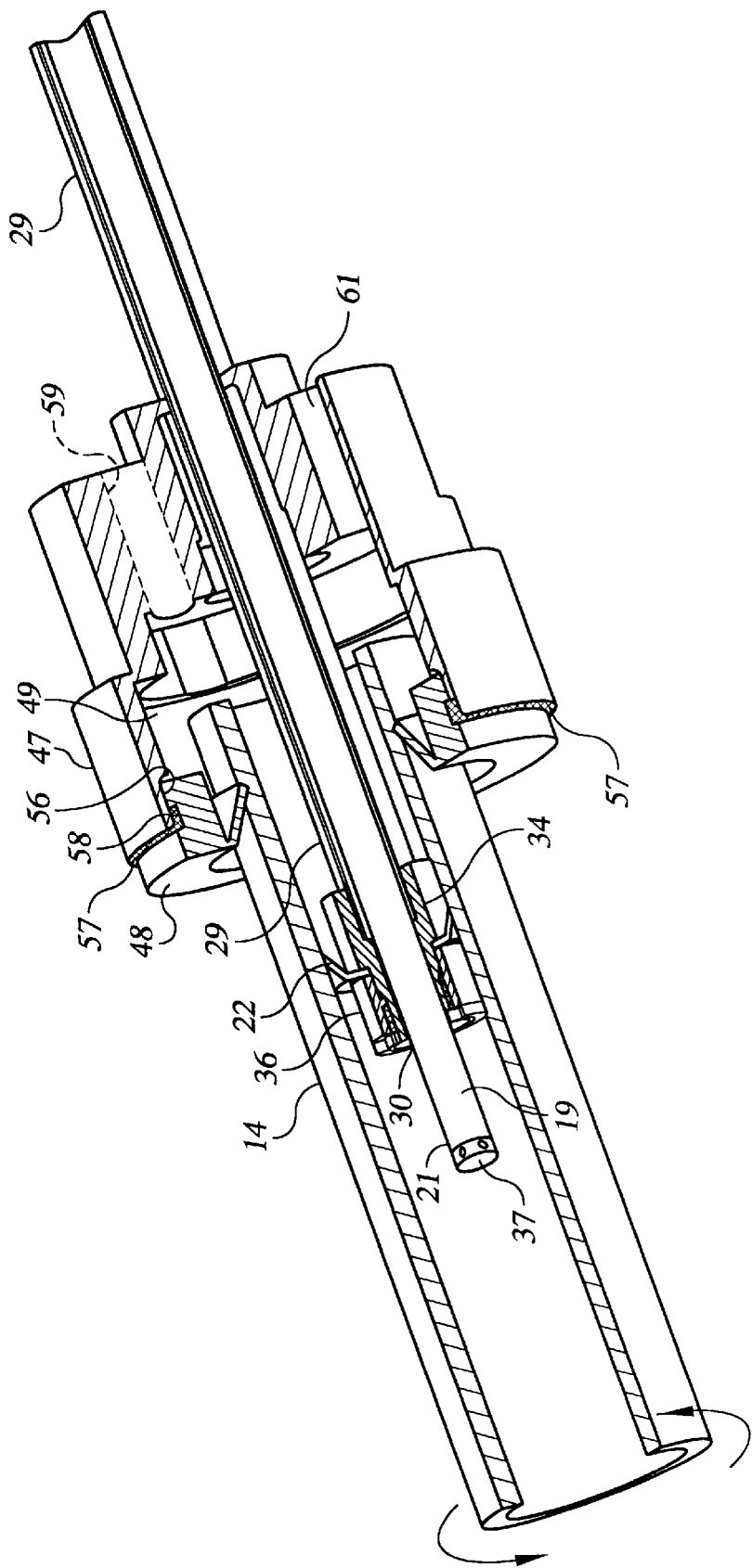
FIG. 5 is a perspective, partially cross-sectional view of the buffer zone arrangement.

In FIG. 5, which is a perspective, partially cross-sectional view of the supply coupling member 47 and its relationship to the delivery tube 19, the coaxial tube 29, and the starter tube 14, it can be seen that member 47 is mounted on coaxial tube 29 in, for example, a press fit, although other mounting means might readily be used. Tubes 29 and 19 (and passageway 30) pass through member 47, as shown. Seal member 48, which is basically the same as that shown in the concurrently filed Mueller application Ser. No. 09/426,491, fits within an enlarged diameter portion 56 of member 47 and is sealed thereto by means of an O-ring 57 which fits within a circumferential groove 58 in member 48. Seal member 48 slips over starter tube 14 and seals chamber 49 from the exterior atmosphere. Seal member 22 functions to seal chamber 49 from the interior of tube 14, thereby creating a buffer zone between the two seals 22 and 48. As seen in the view of FIG. 5, in operation only the starter tube 14 rotates, all of the remaining parts being stationary. First and second ports 59 and 61 communicate with chamber 49 and are connected, for example, to the conduits 53 and 54. Thus, the buffer zone, which includes chamber 49, can be supplied with buffer gas from source 51, and can be flushed by low pressure source 52. The pressure of the gas within the buffer zone, which may be, for example, oxygen, can be controlled by means of pressure monitoring and control means which, as seen in FIG. 5, is part of the low pressure source or it can be part of the gas source. Alternatively, an independent arrangement such as is shown in the concurrently filed Mueller application may be used.

The sealing member 22 and 48 are preferably made of a material such as Teflon® or other suitable durable sealing material, and the remaining portions, except O-ring 57, which also may be of suitable sealing material, are preferably made of a suitable chemically resistant material, such as stainless steel.

Figure 6C:
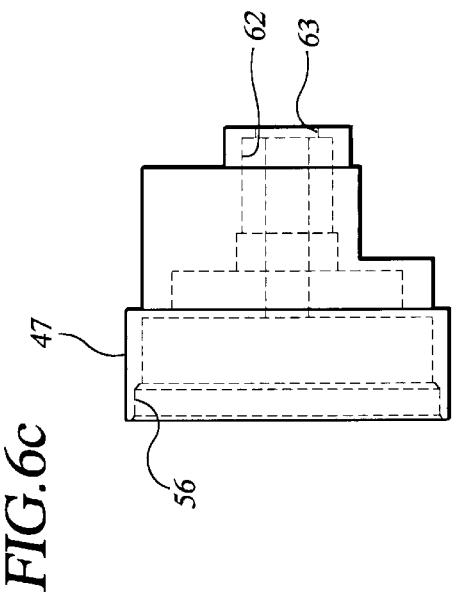
FIGS. 6a through 6c are views of the seal coupling member in the arrangement of FIG. 5.
Figure 6B:
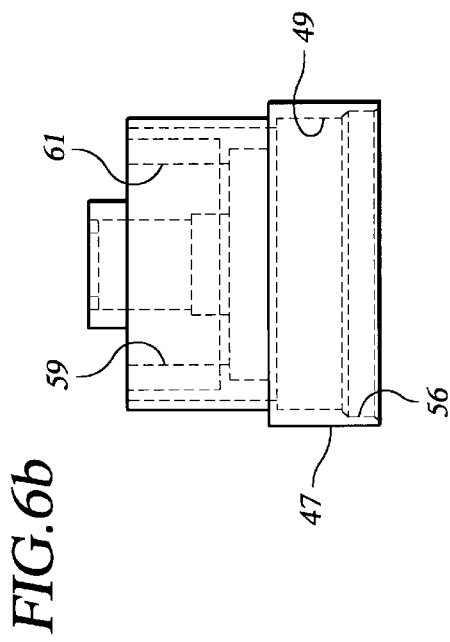
Figure 6A:
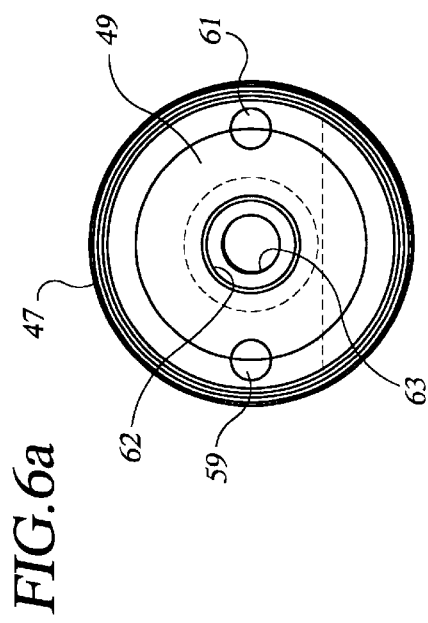

FIGS. 6a through 6c are views of the supply coupling member 47 including a central bore 62 through which tubes 19 and 29 pass. The opening 63 to bore 62 is dimensioned, as mentioned hereinbefore, to be a press fit on coaxial tube 29.

Figure 7:
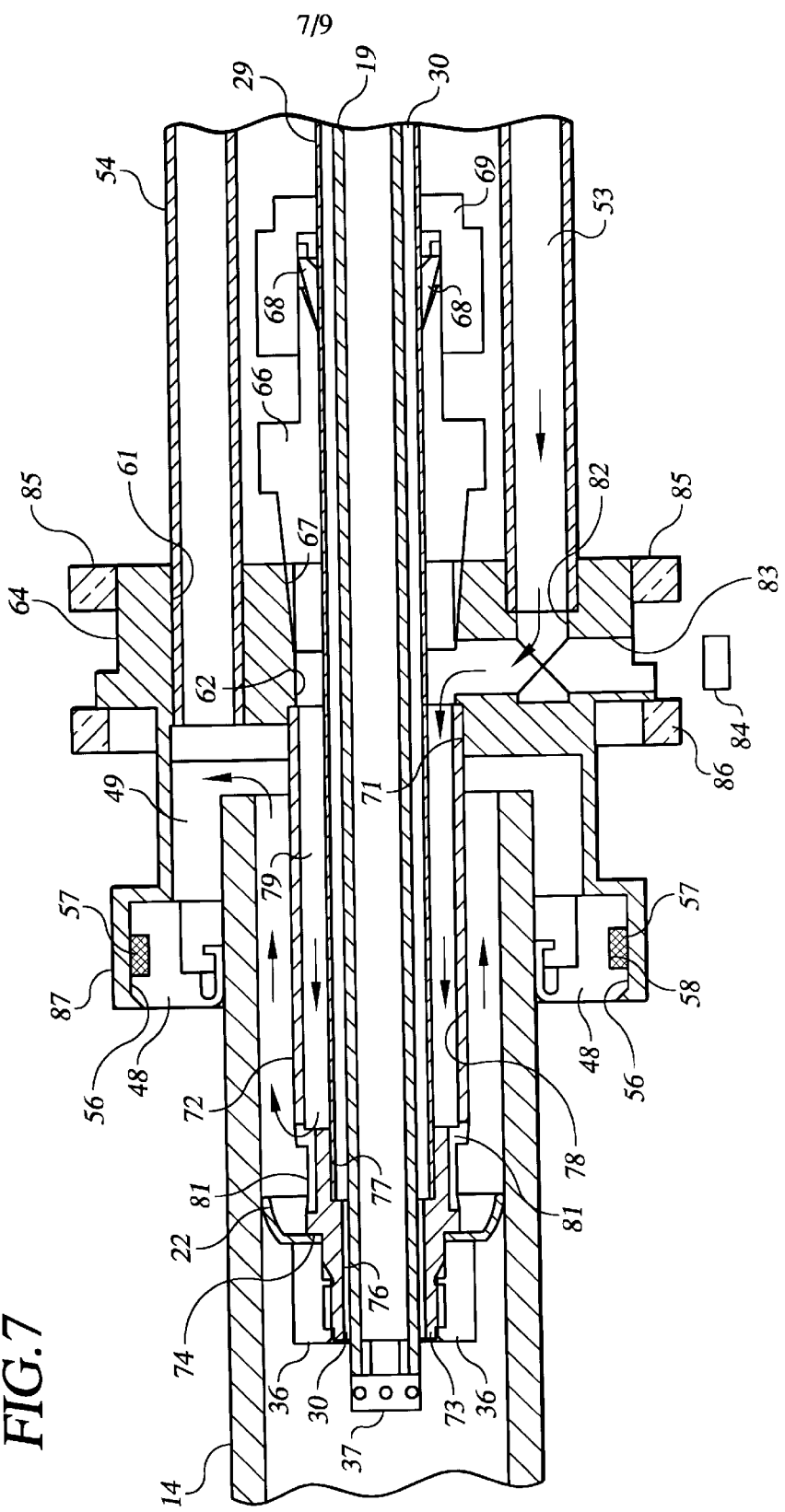
FIGS. 7 is a partial view of a modified, in cross-section, buffer zone arrangement.

In FIG. 7 there is shown a partial elevation view, in cross-section, of an alternative arrangement for delivering the buffer gas to the buffer zone, which incurs a greater circulation of the buffer gases within the zone. The buffer zone provides for a controlled environment, which may be regulated to pressures higher or lower than the chemicals being introduced or delivered, and higher or lower than the atmosphere. Selection of this buffer zone pressure and constituent gas/liquid in this zone controls the leakage directions and the leakage constituents across the seals. Thus, it is desirable that there be a thorough permeation of the buffer gas throughout the buffer zone. The arrangement of FIG. 7 comprises one manner of insuring such a flow of buffer gases.

The embodiment of FIG. 7 comprises a supply coupling member 64 which is modified somewhat from member 47 of the embodiment of FIG. 5. The front portion of member 64 includes the enlarged diameter portion 56 within which seal 48 with O-ring 57 is pressed, as in FIG. 5. In addition, chamber 49, port 61, and conduit 54 which connects to low pressure source 52 are substantially the same as in the embodiment of FIG. 5. Delivery tube 19, coaxial tube 29, and passageway 30 remain the same, however, the mounting of seal member 22 and coaxial tube 29 are different. Coupling member 64 is shown mounted onto tube 29 by means of a tapered nut 66 which wedges into tapered bore 67 in member 64 and which is, in turn, wedged onto tube 29 by tapered wedges 68 inside of nut 69. Central bore 62 has an enlarged base portion 71 within which is mounted a seal mounting member 72. Member 72 may be a press fit in bore portion 71, or other suitable means may be used such as, for example, threads.

Member 72 extends from member 64 to a distal end 73 which may, and preferably is, threaded to receive nut 36 and thereby hold seal member 22 in place against a shoulder 74 on member 72. As can be seen in FIG. 7, member 72 has a first diameter bore 76 which is larger than the outside diameter of delivery tube 19, thereby forming passageway 30. A second, larger diameter bore 77 extends from bore 76 and receives and holds coaxial tube 29 as by a press fit or other suitable means. A third, still larger diameter bore 78 extends from bore 77 to the end of member 72 within member 64. As will be discussed hereinafter, bore 78 forms a portion of the buffer gas zone, forming a passageway 79 which extends from a plurality of outlet ports 81 located behind shoulder 74 and hence sealing member 22 to bore 62 within member 64. An oxygen or other buffer gas supply conduit 53 is connected to an input port 82 which interrupts and communicates with a radial bore 83 which communicates with bore 62. Bore 83 is supplied with a sealing cap 84 which prevents buffer gas from escaping to the atmosphere. The arrows depict the flow path for the buffer gases, from conduit 53 to bore 82, bore 83, bore 62, passageway 79, ports 81, and thence back to chamber 49 in the buffer zone space between starter tube 14 and member 72. The embodiment of the invention shown in FIG. 7 thus insures a movement or flow of buffer gases throughout the buffer zone, which insures more reliable control of leakage, for example.

Inasmuch as the assembly of FIG. 7 is contained within the headstock (or tailstock) of the lathe, it may be centered relative to the bore in the headstock in which it resides by means of bushing members 85 and 86 of, for example, nylon, which are shown. Busihing 86 is designed to slip fit over the large diameter portion 87 of member 64. Various bushings of varying sizes, dependent upon where they are to be fitted, may be used.

Figure 8C:
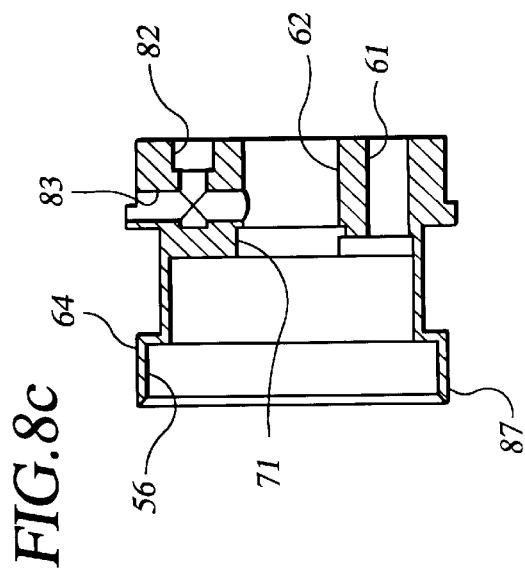
FIGS. 8a through 8c are views of the supply coupling member of the modified buffer zone arrangement of FIG. 7.
Figure 8B:
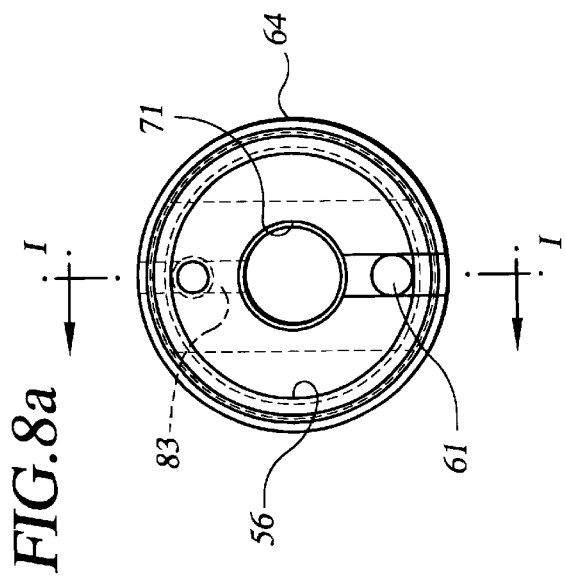
Figure 8A:
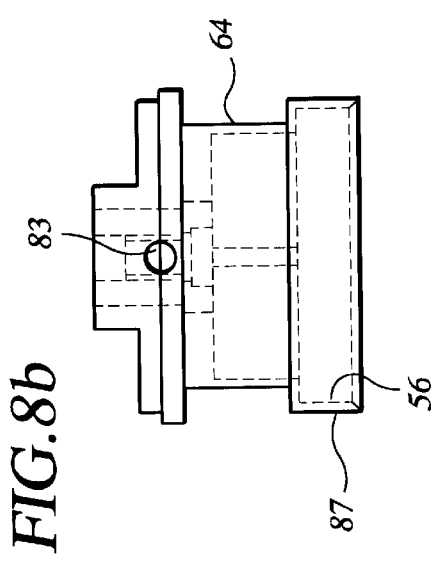
Figure 9D:
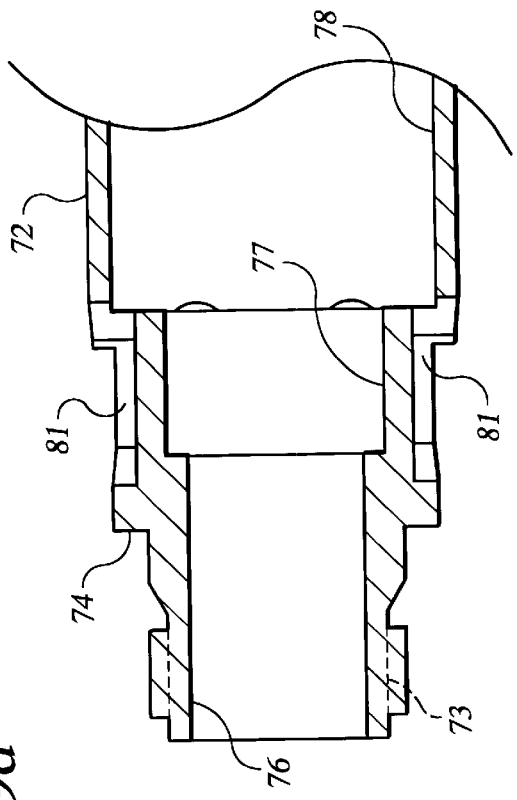
FIGS. 9a through 9d are views of an element of the buffer zone arrangement.
Figure 9C:
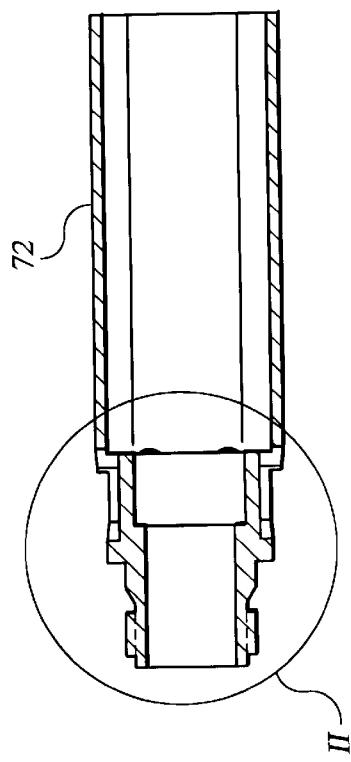
Figure 9A:
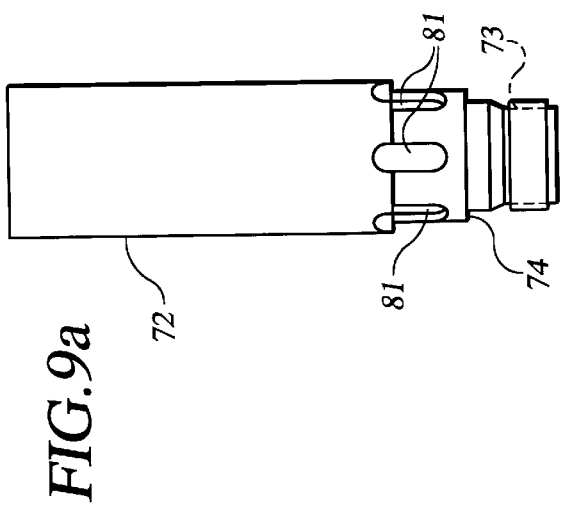
Figure 9B:
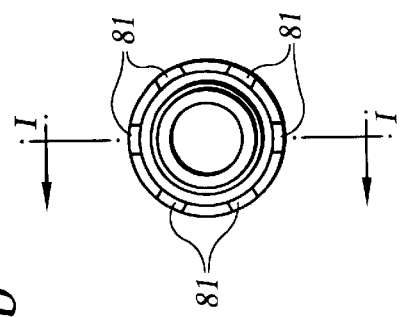

FIGS. 8a through 8c are views of the supply coupling member 64, and FIGS. 9a through 9d, wherein 9d is a detail in the circle II of FIG. 9c, are views of the seal mounting member 72, showing the orientation and relationships discussed with regard to FIG. 7.

It can be appreciated from the foregoing that the herein disclosed invention constitutes a simple and reliable arrangement for monitoring gas pressures within a starter tube, and arrangement which is readily adapted to the addition of elements forming a buffer zone without altering or interfering with the pressure monitoring.

In conclusion, it should be noted that it will be obvious to those skilled in the art that many variations and modifications may be made to the preferred embodiments herein shown without departure from the principles of the present invention. All such variations and modifications are intended to be included herein as being within the scope of the present invention. Further, the corresponding structure, materials, acts, and equivalents of all means or step plus function elements are intended to include any structure, materials, or acts for performing the functions with other specifically claimed elements.

What is claimed is:

1. For use in a chemical delivery system for delivering chemicals to a rotatable tubular member, the system having a delivery tube having a delivery end protruding into the rotatable tubular member, a pressure monitoring apparatus comprising:

a first tubular member surrounding the delivery tube and spaced therefrom forming a first passageway between the delivery tube and said first tubular member and having a first distal end and a second end;

a sealing member mounted on said distal end by a seal mounting member;

said seal mounting member forming a second passageway communicating with said first passageway and with the interior of the rotatable tubular member;

a pressure monitoring member in which said first tubular member terminates at its second end; and said pressure monitoring member having a chamber therein in communication with said first passageway.

2. A pressure monitoring apparatus as claimed in claim 1 and further including a first bore in said pressure monitoring member in communication with said chamber.

3. A pressure measuring apparatus as claimed in claim 2 and further including a pressure monitoring unit in communication with said first bore.

4. A pressure monitoring apparatus as claimed in claim 3 wherein said pressure monitoring unit includes a control unit for controlling the pressure in said chamber.

5. A pressure monitoring apparatus as claimed in claim 1 and further comprising a second bore extending through said pressure member through which the delivery tube passes.

6. A pressure monitoring apparatus as claimed in claim 1 wherein said pressure monitoring member comprises a modified T connection.

7. A pressure monitoring apparatus as claimed in claim 1 wherein said sealing member is made of Teflon®.

8. A pressure monitoring apparatus as claimed in claim 1 wherein said first tubular member is made of stainless steel.

9. A pressure monitoring apparatus as claimed in claim 1 and further comprising a buffer zone apparatus mounted on said first tubular member.

10. A pressure monitoring apparatus as claimed in claim 9 wherein said buffer zone apparatus comprises a supply coupling member having a chamber therein for containing buffer zone gases.

11. A pressure monitoring apparatus as claimed in claim 10 wherein said buffer zone apparatus further comprises an external seal mounted on said supply coupling member for sealing said chamber from the atmosphere.

12. A pressure monitoring apparatus as claimed in claim 11 and further comprising first and second ports in said supply coupling member in communication with said chamber.

13. A pressure monitoring apparatus as claimed in claim 12 wherein said first port is connected to a buffer gas source.

14. A pressure monitoring apparatus as claimed in claim 12 wherein said second port is connected to a low pressure source.

15. For use in a chemical delivery system for delivering chemicals to a rotatable glass tube, the system having a delivery tube having a delivery end protruding into the rotatable glass tube, a pressure monitoring system comprising:

a first tubular member surrounding the delivery tube and spaced therefrom forming a first passageway between the delivery tube and said first tubular member and having a first, distal, end and a second end;

a first sealing member mounted on said distal end by means of a seal mounting member;

said seal mounting member forming a second passageway communicating with said first passageway and with the interior of the rotatable glass tube;

a pressure monitoring member in which said first tubular member terminates at its second end;

a buffer zone forming apparatus mounted on said first tubular member intermediate said first and second ends and fixed thereto;

said buffer zone forming apparatus having a second sealing member for sealing the buffer zone to the exterior of the rotatable glass tube.

16. The pressure monitoring system as claimed in claim 15 wherein said buffer zone forming apparatus includes a coupling member having a chamber therein, said buffer zone extending from said first sealing member to said second sealing member and including said chamber.

17. The pressure monitoring system as claimed in claim 16 wherein said coupling member has first and second ports therein in communication with said buffer zone.

18. The pressure monitoring system as claimed in claim 17 wherein said first port is connected to a source of buffer gases and said second port is connected to a low pressure source.

19. The pressure monitoring system as claimed in claim 17 wherein said seal mounting member comprises a second tubular member extending from said coupling member and coaxial with said first tubular member and spaced therefrom, thereby creating a passageway for the buffer gases.

20. The pressure monitoring system as claimed in claim 19 wherein said second tubular member has a distal end upon which said first sealing member is mounted.

21. The pressure monitoring system as claimed in claim 20 wherein said second tubular member has at least one outlet port intermediate said distal end thereof and said coupling member for introducing buffer gases into said buffer region.

* * * * *